US008332600B2

(12) United States Patent
Ito et al.

(10) Patent No.: US 8,332,600 B2
(45) Date of Patent: Dec. 11, 2012

(54) STORAGE SYSTEM AND METHOD FOR OPERATING STORAGE SYSTEM

(75) Inventors: Akira Ito, Yokohama (JP); Etsutaro Akagawa, Kawasaki (JP); Atsushi Sutoh, Yokohama (JP); Masanori Takata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 573 days.

(21) Appl. No.: 12/289,134

(22) Filed: Oct. 21, 2008

(65) Prior Publication Data

US 2010/0070724 A1 Mar. 18, 2010

(30) Foreign Application Priority Data

Sep. 16, 2008 (JP) .................................. 2008-236980

(51) Int. Cl.
G06F 13/00 (2006.01)
G06F 13/28 (2006.01)
(52) U.S. Cl. .................. 711/162; 711/161; 711/E12.103
(58) Field of Classification Search .................. None
See application file for complete search history.

(56) References Cited

U.S. PATENT DOCUMENTS

| 5,649,152 | A | 7/1997 | Ohran et al. |
| 7,120,768 | B2 | 10/2006 | Mizuno et al. |
| 7,237,076 | B2 | 6/2007 | Nakano et al. |
| 7,457,934 | B2 * | 11/2008 | Yagawa ........................ 711/170 |
| 2007/0180000 | A1 | 8/2007 | Mine et al. |

FOREIGN PATENT DOCUMENTS

JP 2007-200182 A 8/2007
* cited by examiner

Primary Examiner — Kevin Verbrugge
Assistant Examiner — Eric S Cardwell
(74) Attorney, Agent, or Firm — Stites & Harbison, PLLC; Juan Carlos A. Marquez, Esq

(57) ABSTRACT

In acquiring a snapshot, when data in a P-VOL is updated, it is determined whether the same data as target data to be stored in a certain second storage area specified by a certain second address of a D-VOL is already stored in a different second storage area specified by a different second address of the D-VOL, the target data being the differential data generated by the update. When the same data as the target data is stored, the target data is not newly stored in the D-VOL, and the different second address, specifying the different second storage area where the same data is stored, is registered in a snapshot management table (CoW table), in association with a certain first address specifying a certain first storage area where the data from which the target data has been generated is stored.

9 Claims, 10 Drawing Sheets

133 DIFFERENTIAL DATA MANAGEMENT TABLE

| BLOCK ADDRESS OF D-VOL (1331) | REFERENCE COUNTER (1332) | HASH VALUE (1333) |
|---|---|---|
| 0 | 1 | as09fj01k |
| 1 | 0 | NONE |
| 2 | 4 | ds90f9l23 |
| ⋮ | ⋮ | ⋮ |

FIG. 3C

| EXISTING DATA DUPLICATION EXCLUSION TABLE | | | |
|---|---|---|---|
| BLOCK ADDRESS OF D-VOL | BLOCK ADDRESS OF P-VOL | START GENERATION | END GENERATION |
| 0 | 1 | 35 | 64 |
| 1 | | | |
| 2 | 14 | 23 | 29 |
| ⋮ | ⋮ | ⋮ | ⋮ |

FIG. 3D

STORAGE SYSTEM AND METHOD FOR OPERATING STORAGE SYSTEM

CROSS-REFERENCE TO RELATED APPLICATIONS

The present application claims a priority from Japanese Patent Application No. 2008-236980 filed on Sep. 16, 2008, the content of which herein incorporated by reference.

BACKGROUND OF THE INVENTION

1. Field of the Invention

The present invention relates to a storage system and a method for operating the storage system, and more particularly, relates to a technique for efficiently managing differential data to be stored to provide a snapshot function, so that a storage area can be effectively used.

2. Related Art

One of the functions of the storage system is a function of providing a state of a volume in operation (hereinafter referred to as an operation volume) at a certain time point upon request from a user or others. This function (hereinafter referred to as a snapshot function) is implemented in the following way. Specifically, data for reproducing a snapshot of the operation volume at a certain time point is usually backed up in a volume different from the operation volume (hereinafter referred to as a differential volume). Then, upon request from a user, a snapshot at a certain time point is reproduced by using data in the current operation volume and the differential data backed up in the differential volume. For example, see descriptions given in U.S. Pat. Nos. 5,649,152, 7,120,768, and 7,237,076.

To implement the snapshot function in the aforementioned way, management of differential data accumulated in the differential volume is critical. In other words, since the storage system can provide only a limited storage space as a differential volume, it is desirable that the differential data be managed in the differential volume as efficiently as possible.

SUMMARY OF THE INVENTION

The present invention has been made under the above circumstances, and an object of the present invention is to provide a storage system and a method for operating the storage system, capable of efficiently managing differential data to be stored to provide a snapshot function, so that a storage area can be used effectively.

In order to achieve the above object, one aspect of the present invention provides a storage system including an I/O processor that performs I/O processing on data read from and written into a P-VOL serving as a first logical volume, in response to a request from an external device; and a snapshot processor that, in order to reproduce a snapshot representing a state of the P-VOL at a certain time point, stores, in a D-VOL serving as a second logical volume, differential data generated by updating data of the P-VOL, and that manages a snapshot management table in which a second address is registered in association with a first address, the first address specifying a first storage area of the P-VOL, and the second address specifying a second storage area of the D-VOL storing therein the differential data acquired by updating the data in the first storage area specified by the first address. The storage system further includes a differential data management unit that, when data in the P-VOL is updated, determines whether the same data as target data to be stored in a certain one of aforementioned second storage areas specified by a certain one of aforementioned second addresses is already stored in different one of the second storage areas specified by a different one of the second addresses of the D-VOL, the target data being the differential data generated by the update. When the same data as the target data is not stored, the differential data management unit stores the target data in the certain second storage area of the D-VOL, which is unused, and registers, in the snapshot management table, the certain second address that specifies the certain second storage area where the target data is stored, in association with a certain one of aforementioned first addresses that specifies the first storage area where the data from which the target data has been generated is stored. When the same data as the target data is stored, the differential data management unit does not store the target data in the D-VOL, and registers, in the snapshot management table, the different second address that specifies the different second storage area where the same data as the target data is stored, in association with the certain first address that specifies the certain first storage area where the data from which the target data has been generated is stored.

In addition, the problem disclosed in this application and the solution method to the problem will become clear from the embodiment of the invention and the drawings.

According to the present invention, it is possible to effectively use a storage resource upon implementation of a snapshot.

BRIEF DESCRIPTION OF THE DRAWINGS

FIG. 3C is one example of a differential data management table 133;

FIG. 3D is one example of an existing data duplication exclusion table 134;

DETAILED DESCRIPTION OF THE INVENTION

Now, embodiments of the present invention will be described below in detail with reference to the accompanying drawings.

Figure 1A:
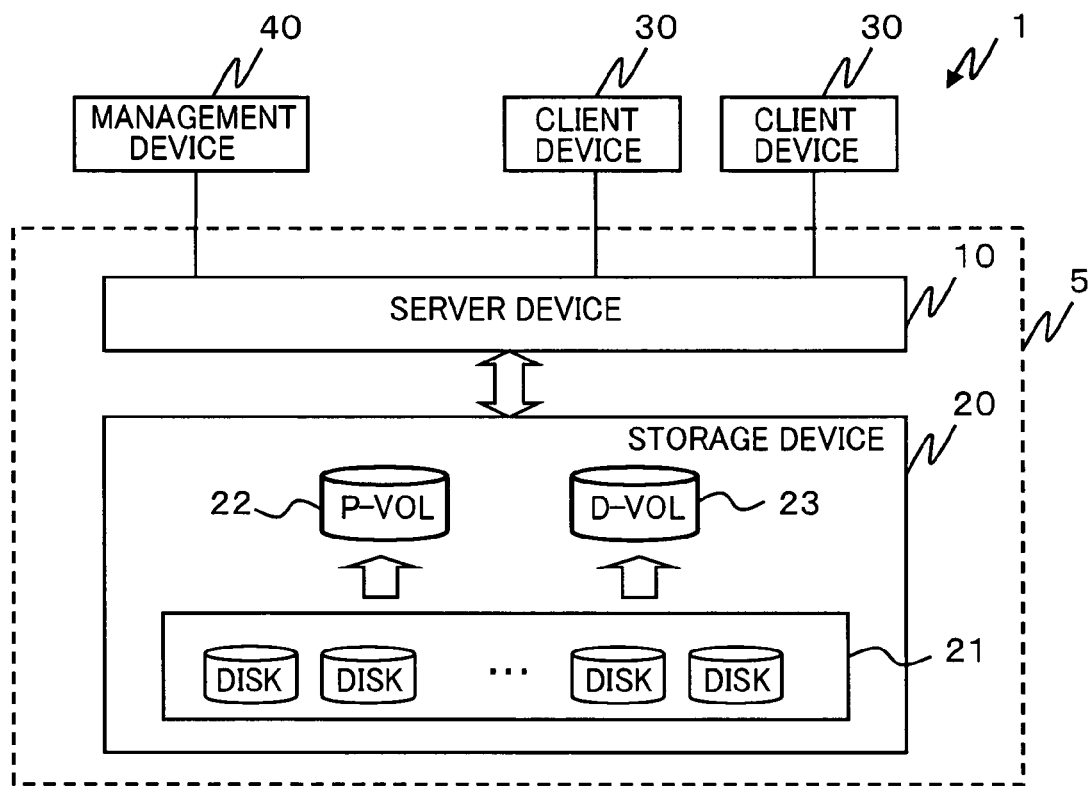
FIG. 1A is a view showing hardware of an information processing system 1.

FIG. 1A shows a hardware configuration of an information processing system 1 to be later-explained as one embodiment of the present invention. As shown in the figure, the information processing system 1 includes a server device 10, a storage device 20, a client device 30 (external device, host device), and a management device 40, all of those constituting a storage system 5. The server device 10, the client device 30, and the management device 40 are computers (information processing devices) such as a personal computer, a workstation, and a main frame.

The server device 10 and the storage device 20 are communicably connected to each other via a communication network such as a Local Area Network (LAN) and a Storage Area Network (SAN) The server device 10 is communicably connected to the client device 30 and the management device 40 via a LAN, the Internet, a public telecommunication network, a lease line, or the like.

The client device 30 uses a storage area provided by the storage system 5. An operator or the like provides a setting function, a management function or the like by use of the management device 40.

The server device 10 and the storage device 20 may be integrally configured so as, for example, to be contained in the same storage system, or may be configured as different bodies so as, for example, to be contained in different storage systems. The management device 40 may be the client 30, or may be configured as part of the server device 10 or the storage device 20.

The server device 10 gains access to the storage area of the storage device 20 upon reception of a data input/output request from the client device 30. The storage device 20 has physical storage media 21 such as a hard disk drive or the like. In the storage device 20, the physical storage media 21 are operated in, for example, a Redundant Array of Inexpensive Disks (RAID) mode.

Incidentally, a disk array device is an example of the storage device 20. The disk array device has a channel controller that performs communication with the client device 30, a disk controller that gains access to the physical storage media 21, a cache memory for use in data delivery between the channel controller and the disk controller, and a communication mechanism that communicably connects the above components to one another.

The storage device 20 provides the server device 10 with a logical volume which is a logical storage area. Hereinafter, the logical volume is referred to as a LV. It should be noted that, in a later-described snapshot function, both a first logical volume (primary volume) and a second logical volume (differential volume) are LVs. Hereinafter, the first logical volume is referred to as a P-VOL 22 (P-VOL: Primary Volume), and the second logical volume is referred to as a D-VOL 23 (D-VOL: Differential Volume).

Figure 1B:
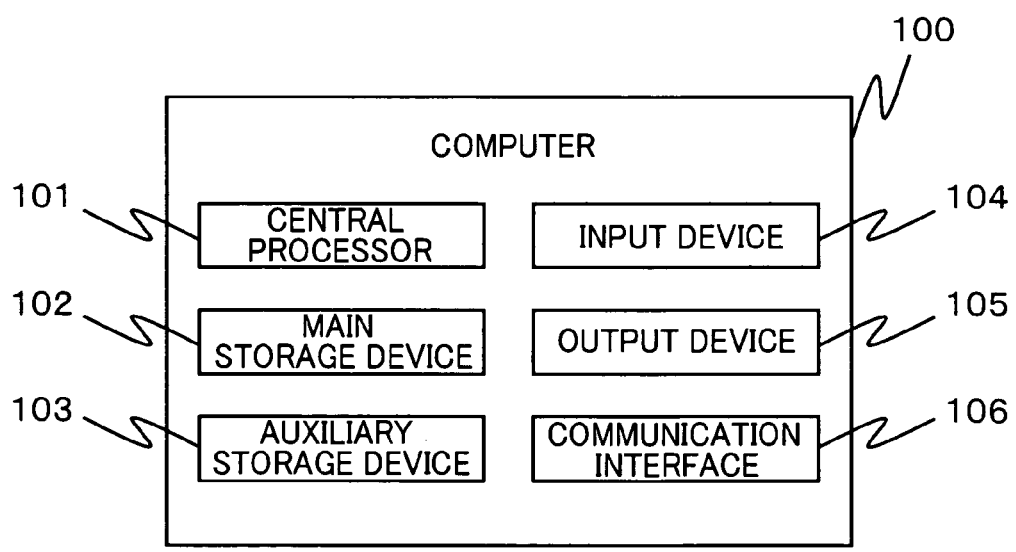
FIG. 1B is a view showing one example of a hardware configuration of a computer which can be used as a server device 10, a client device 30, and a management device 40.

FIG. 1B shows an example of a computer that can be used as the server device 10, the client device 30 or the management device 40. A computer 100 includes a central processor 101 (for example, a central processing unit (CPU) or a micro processing unit (MPU)), a main storage device 102 (for example, a random access memory (RAM) or a read-only memory (ROM)), an auxiliary storage device 103 (for example, a hard disk), an input device 104 (for example, a keyboard and a mouse) that receives an operation input from a user, an output device 105 (for example, a liquid crystal monitor), and a communication interface 106 (for example, a network interface card (NIC) and a host bus adapter (HBA)) that allows communication with other devices.

Figure 2:
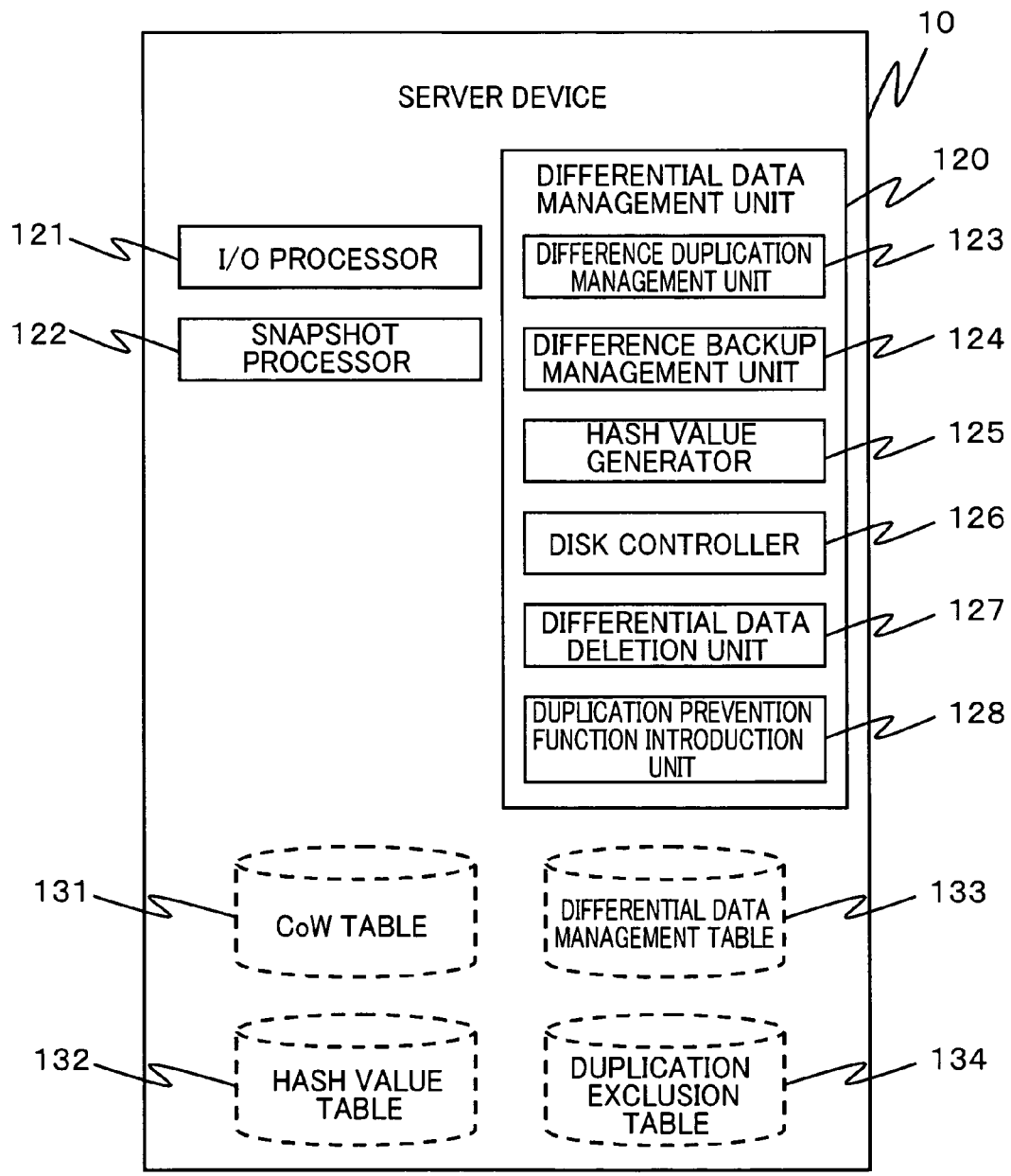
FIG. 2 is a view showing main functions of the server device 10.

FIG. 2 shows main functions of the server device 10 as well as data managed by the server device 10. The server device 10 includes an I/O processor 121, a snapshot processor 122, and a differential data management unit 120 having more units therein providing different functions. The differential data management unit 120 provides functions of a difference duplication management unit 123, a difference backup management unit 124, a hash value generator 125, a disk controller 126, a differential data deletion unit 127, and a duplication prevention function introduction unit 128.

The aforementioned functions of the server device 10 are implemented when a CPU 11 of the server device 10 executes a program read out into a memory 12, or by hardware of the server device 10. The implementation of the aforementioned functions is, in some cases, supported by functions implemented by the operating system operated by the server device 10 and other software such as a device driver.

The I/O processor 121 shown in FIG. 2 writes or reads data to and from the storage device 20 upon reception of an I/O request (data writing request and data reading request) sent from the client device 30. Moreover, the I/O processor 121 transmits, to the client device 30, a report on completion of data writing, read-out data, or the like.

In addition, when the server device 10 is a network attached storage (NAS), the I/O processor 121 further includes functions characteristic of the NSA, including a file shearing function such as a network file system (NFS) and a common internet file system (CIFS), and a file system.

The snapshot processor 122 performs the following operations: reception of a snapshot acquisition request sent from the client device 30, acquisition of a snapshot at a certain time, reception of a snapshot reference request, provision of a snapshot to the client device 30, and deletion of a snapshot.

The acquisition of a snapshot mentioned here means to back up, in the D-VOL 23, block data updated in the P-VOL 22 (hereinafter referred to as differential data). Moreover, the provision of a snapshot means to reproduce the state of the P-VOL 22 at a certain point in the past, based on current data in the P-VOL 22 and differential data backed up in the D-VOL 23. Further, the deletion of a snapshot means to delete, from the D-VOL 23, differential data to be deleted.

Details on the differential data management unit 120 shown in FIG. 2 will be described later.

As shown in FIG. 2, the server device 10 manages a CoW table 132 (CoW: Copy On Write), a hash value table 132, a differential data management table 133, and an existing data duplication exclusion table 134 (which is abbreviated as a duplication exclusion table in the figure). In the following explanation, the hash value table 132 is stored in the P-VOL 22, and the CoW table 131, the differential data management table 133, and the existing data duplication exclusion table 134 are stored in the D-VOL 23. However, a storage position of each table is not limited to the above.

Figures 3A, 3B:
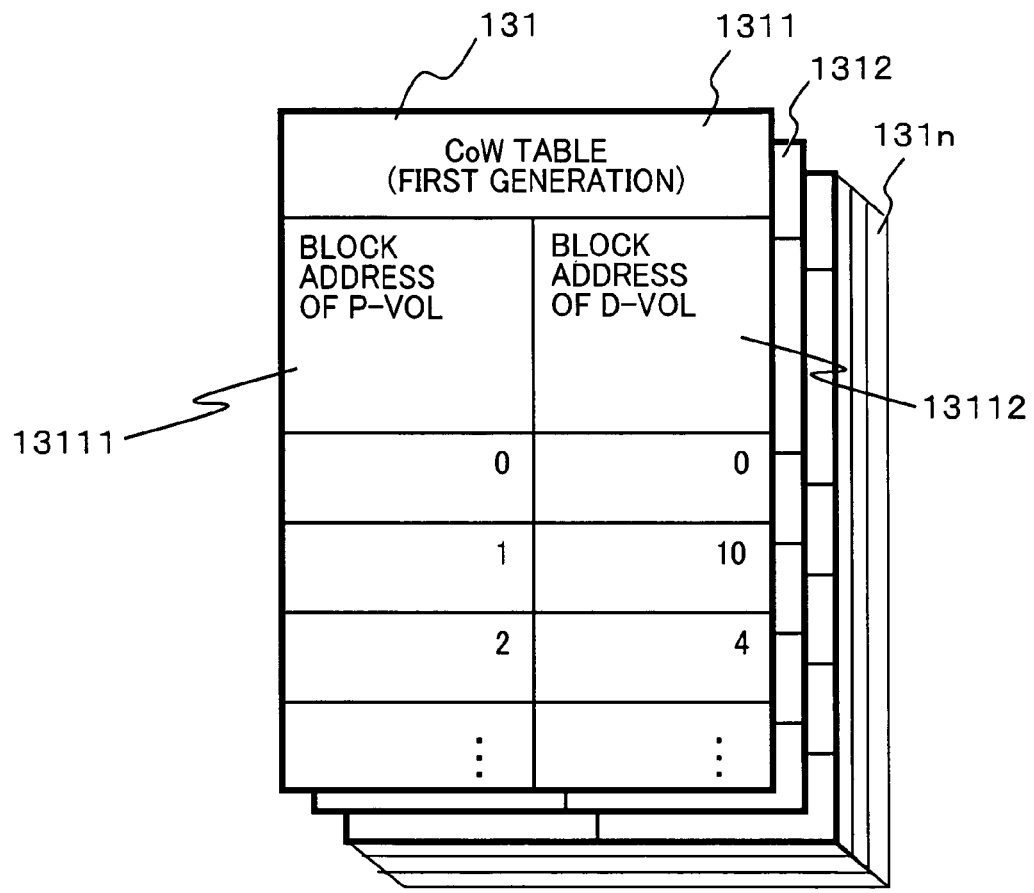
FIG. 3A is one example of a CoW table 131.
FIG. 3B is one example of a hash value table 132.

FIG. 3A shows an example of the CoW table 131. The CoW table 131 is a table used to manage a snapshot. The CoW table 131 is composed of at least one or more individual table groups corresponding to the respective generations of the snapshots. Hereinafter, these table groups are referred to as generation tables 1311 to 131n.

In the CoW table 131, a block address 13112 (second address) is managed in association with a block address 13111 (first address). Here, the block address 13111 (first address) specifies a storage area (first storage area) of the P-VOL 22, whereas the block address 13112 (second address) specifies a storage area (second storage area) of the D-VOL 23, in which differential data to be backed up for acquisition of a snapshot is stored.

Additionally, when no differential data is acquired, data indicating "0" or "NONE" which indicates no actual data is stored in the corresponding block address 13112 of the D-VOL 23.

FIG. 3B shows an example of the hash value table 132. As shown in the figure, in the hash value table 132, a hash value 1322 generated from data stored at a block address 1321 of the P-VOL 22 is managed in association with the block address 1321 of the P-VOL 22.

FIG. 3C shows an example of the differential data management table 133. As shown in the figure, in association with a block address 1331 of the D-VOL 23, a reference counter 1332 and a hash value 1333 of differential data stored at the corresponding block address 1331 of the D-VOL 23 are stored in the differential data management table 133.

FIG. 3D shows an example of the existing data duplication exclusion table 134. As shown in the figure, a start generation 1343 and an end generation 1344 are managed in association with a combination of a block address 1341 of the D-VOL 23 and a block address 1342 of the P-VOL 22. Details on the existing data duplication exclusion table 134 will be described later.

An explanation will be next given of processing performed in the above-explained information processing system 1.

<Duplication Storage Prevention of Differential Data to D-VOL 23>

In the information processing system 1, when a snapshot is acquired, peculiar processing is performed to prevent differential data from being stored in duplication in the D-VOL 23. The following will explain this processing with a flowchart shown in FIG. 4. In the following explanation, it should be noted that a letter "S" added before a reference numeral means a "step".

First, the I/O processor 121 of the server device 10 receives a request to write data into the P-VOL 22 from the client device 30 (S411). Then, the I/O processor 121 instructs the differential data management unit 120 to write data, by designating a block address (hereinafter referred to as a target block address) of the P-VOL 22 where data is written and writing target data (hereinafter referred to as target data) (S412).

Upon receipt of the above instruction, the difference duplication management unit 123 of the differential data management unit 120 determines whether any differential data currently used by the P-VOL 22 exists in the D-VOL 23 (S413). This determination is executed by, for example, checking whether there is a CoW table 131 for at least one generation that manages the snapshot. When there is a snapshot being used (S413: YES), processing goes to S414, and when there is no snapshot being used (S413: NO), processing goes to S423.

Next, the difference backup management unit 124 determines whether differential data, which is generated for the writing of the target data to the P-VOL 22 and which is to be backed up in the D-VOL 23, is already stored in the D-VOL 23. This determination here is performed by checking whether a block address of the D-VOL 23 is stored in the latest snapshot generation of the target block address in the CoW table 131. When the differential data is not backed up yet (S414: NO), processing goes to S415. When the differential data is already backed up (S414: YES), processing goes to S423.

In S415, the difference duplication management unit 123 acquires a hash value of the target block address from the hash value table 132. Then, the difference duplication management unit 123 checks whether the differential data management table 133 has a hash value that matches the hash value acquired from the hash value table 132 (S416). When there is a matching hash value (S416: YES), processing goes to S417, and when there is no matching hash value (S416: NO), processing goes to S420.

In S417, the difference duplication management unit 123 acquires a block address of the D-VOL 23 which corresponds to the matching hash value from the differential data management table 133. Then, the difference duplication management unit 123 stores the block address of the D-VOL 23 acquired from the differential data management table 133 in the generation of the target block address in the CoW table 131 (S418). At this time, the difference duplication management unit 123 increments by 1 the reference counter 1332 corresponding to the block address of the D-VOL 23 in the differential data management table 133 (S419). After S419, processing goes to S423.

In S420, the difference duplication management unit 123 decides a block address of the D-VOL 23 serving as a destination where the differential data is backed up (hereinafter, this block address is referred to as a back-up destination block address). Then, the difference duplication management unit 123 stores differential data at the decided back-up destination block address (S421). At this time, the difference duplication management unit 123 stores this back-up destination block address in the generation of the target block address in the CoW table 132 (S422).

In the processing in S423 and the following processing, the target data is stored in the P-VOL 22. Specifically, the difference duplication management unit 123 stores the target data at the target block address of the P-VOL 22 (S423), and also stores the hash value of the target data in the hash value table 132.

Thus, in acquiring the snapshot, the differential data management unit 120 determines whether differential data is already stored in the D-VOL 23. When differential data is stored, the block address of the already stored differential data is stored in the CoW table 131. Thereby, differential data of the same block address of the D-VOL 23 is made to correspond to the multiple block addresses of the P-VOL 22. This makes it possible to prevent the same data from being written to the different blocks of the D-VOL 23 and to use the storage area of the D-VOL 23 effectively.

Note that, in the above explanation, duplication check (comparison of the hash value) is performed before differential data is backed up in the D-VOL 23, but the duplication check may be performed after differential data is backed up in the D-VOL 23 and delete duplicated data from the D-VOL 23.

Moreover, the hash value of data of each block address of the P-VOL 22 may be calculated when differential data is backed up in the D-VOL 23. Alternatively, the hash value may be calculated before backing up—for example, at the time of storing data to the P-VOL 22—and the calculated hash value may be prestored in the hash value table 132. In the latter case, the calculation of the hash value of data of the P-VOL 22 and the backing up of the differential data are not performed at the same time, and as a result, concentration of a load for a specific time period can be efficiently prevented.

<Deletion of Differential Data>

Figure 5:
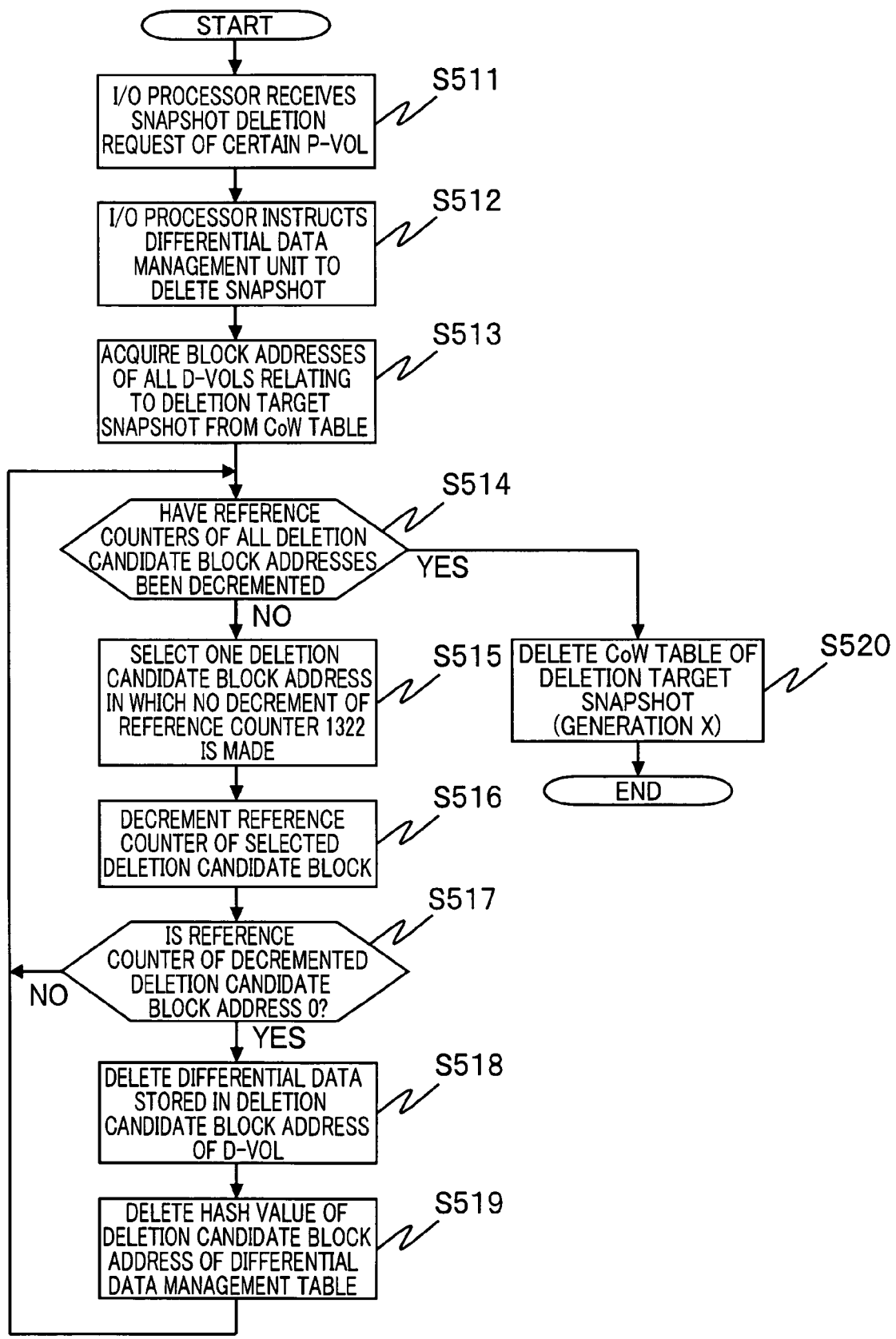
FIG. 5 is a flowchart explaining processing performed to delete differential data from a D-VOL 23.

The aforementioned mechanism makes it possible to prevent the same differential data from being stored in duplication in the D-VOL 23. However, introduction of this mechanism may result in a situation where the same differential data stored in the D-VOL 23 is made to correspond to the multiple block addresses of the P-VOL 22. Accordingly, in order to delete a certain snapshot, it must be checked that the differential data of the certain snapshot corresponds to none of the block addresses of the P-VOL 22 in the CoW table 131. The following will explain processing of this checking with referring to a flowchart shown in FIG. 5.

First, the I/O processor 121 of the server device 10 receives a deletion request of a snapshot of a certain P-VOL 22 from the client device 30 (S511). Hereinafter, the snapshot is referred to as a deletion target snapshot, and the deletion request is referred to as a snapshot deletion request. Then, the I/O processor 121 instructs the differential data management unit 120 to delete the snapshot, by designating the deletion target snapshot of a specific generation (S512). Here, the specific generation is assumed to be a "generation x" as an example.

Next, the differential data deletion unit 127 acquires, from the CoW table 131, all block addresses of the D-VOL 23, at which the differential data of the deletion target snapshot (generation x) is stored (S513). Hereinafter, these block addresses are referred to as deletion candidate block addresses.

After that, the differential data deletion unit 127 determines whether a value of the reference counter 1332 in the differential data management table 133 has been decremented for all the deletion candidate block addresses (generation x) (S514). When the values have not been decremented (S514: NO), processing goes to S515, and when the values have been decremented, processing goes to S519.

In subsequent S515, the differential data deletion unit 127 selects one deletion candidate block address the reference counter 1332 for which has not been decremented yet.

In S516, the differential data deletion unit 127 decrements the value of the reference counter 1332 by 1 for the deletion candidate block address selected in S515.

In S517, the differential data deletion unit 127 determines whether the value of the reference counter 1332 of the deletion candidate block address after being decremented in S516 is "0" (lower limit value). When the value of the reference counter 1332 is "0" (S517: YES), processing goes to S518, and when the value is not "0" (S517: NO), processing goes back to S514.

In S518, the differential data deletion unit 127 deletes differential data stored in the storage area designated by the selected deletion candidate block address of the D-VOL 23. It should be noted that the deletion mentioned here means to make it possible to write new data in the storage area of the deletion candidate block address.

In S519, the differential data deletion unit 127 deletes the hash value 1333 of the selected deletion candidate block address in the differential data management table 133. After that, processing goes back to S514.

In order to ensure security by, for example, preventing malicious access by a third person, "0", "NONE", or the like which is data useless as actual data may be stored in the storage area where deleted differential data was stored or the storage area of the deleted differential management table 133 where the hash value 1333 was stored.

In S520, the differential data deletion unit 127 deletes the CoW table 131 of the deletion target snapshot (generation x).

As explained above, the differential data stored in the storage area of the deletion candidate block address of the D-VOL 23 is deleted from the D-VOL 23 only when the value of the reference counter 1332 of the concerned deletion candidate block address in the differential data management table 133 reaches "0" (lower limit value), namely, when it is determined that the differential data does not correspond to any of the block addresses of the P-VOL 22.

According to the forgoing method, it is possible to safely delete differential data from the D-VOL 23 when deleting the snapshot. Then, the storage area of the D-VOL 23 where the differential data has been deleted can be reused as a back-up destination of newly generated differential data, thereby allowing an efficient operation of the D-VOL 23.

<Method of Introduction to Existing Environment>

Figure 4:
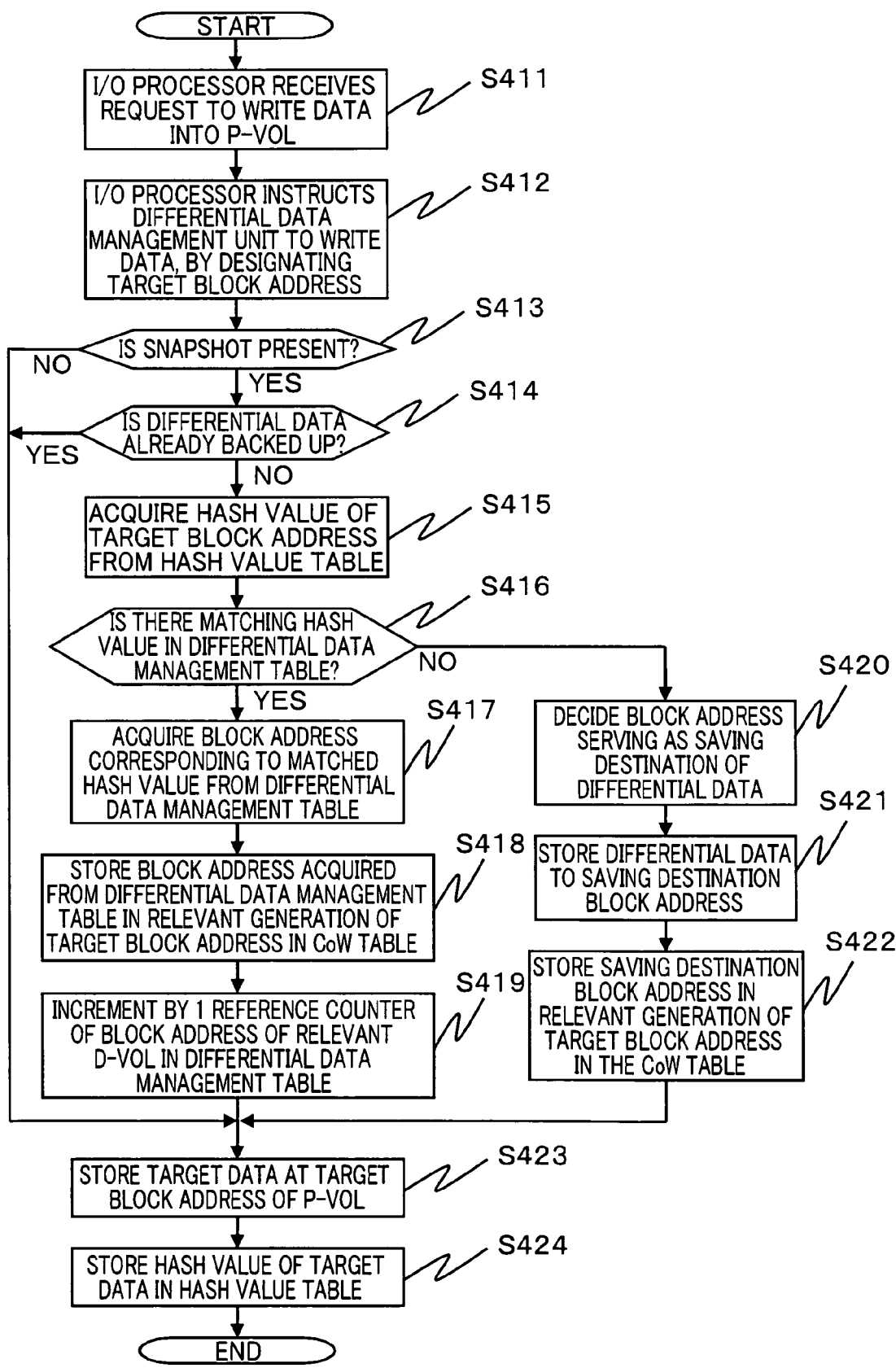
FIG. 4 is a flowchart explaining processing performed to acquire a snapshot.

Next, with reference to flowcharts shown in FIGS. 6A and 6B, an explanation will be given of a method of introducing the duplication prevention mechanism to the existing system in which a snapshot function is already introduced, the mechanism preventing differential data of the D-VOL 23 shown in FIG. 4 from being stored in duplication. It should be noted that processing to be explained below is started upon receipt of an instruction from, for example, the management device 40 or client device 30.

Figure 6A:
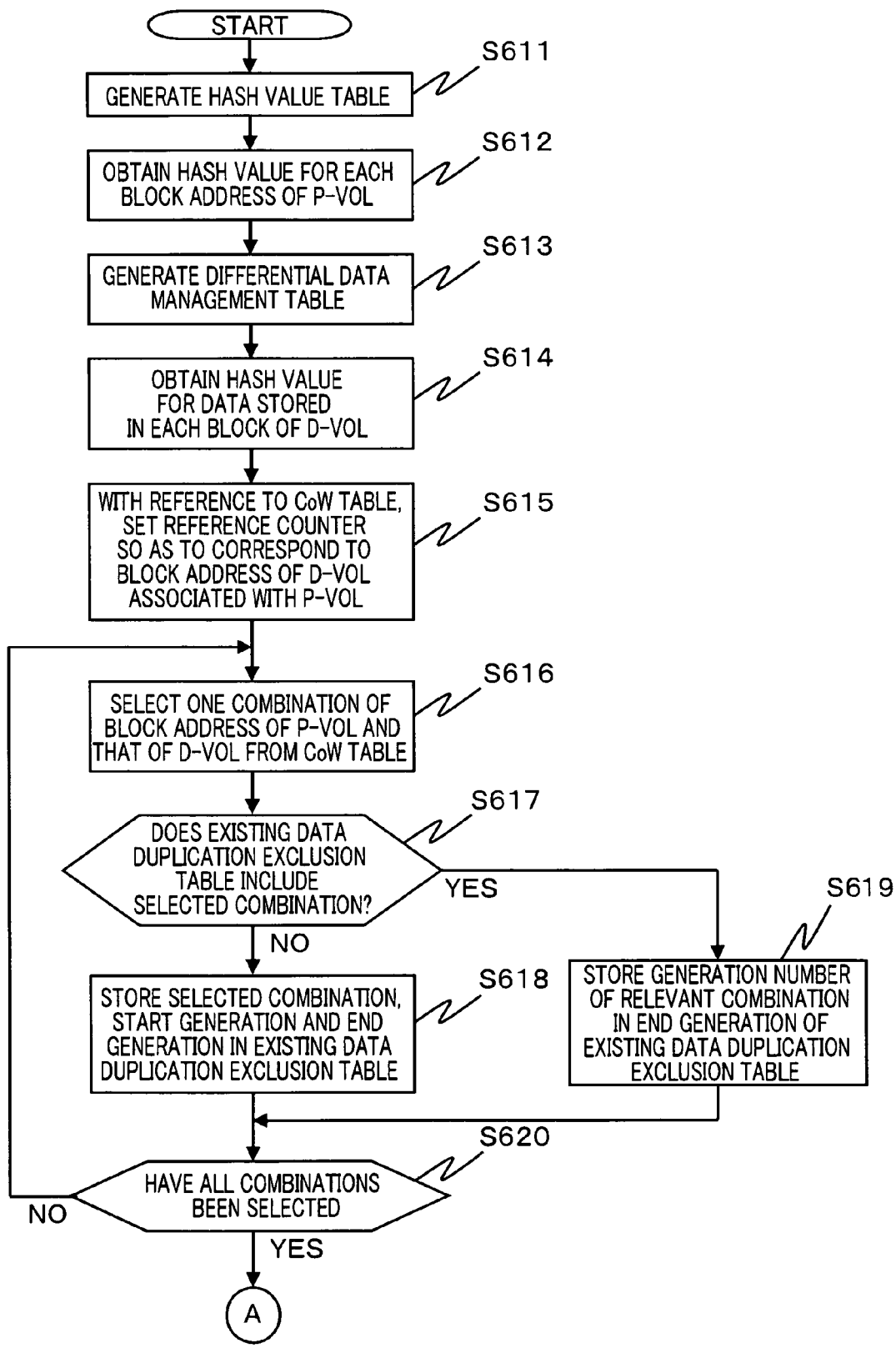
FIG. 6A is a flowchart explaining a procedure for introducing into an existing storage system a mechanism for preventing differential data from being stored in duplication in the D-VOL 23.
Figure 6B:
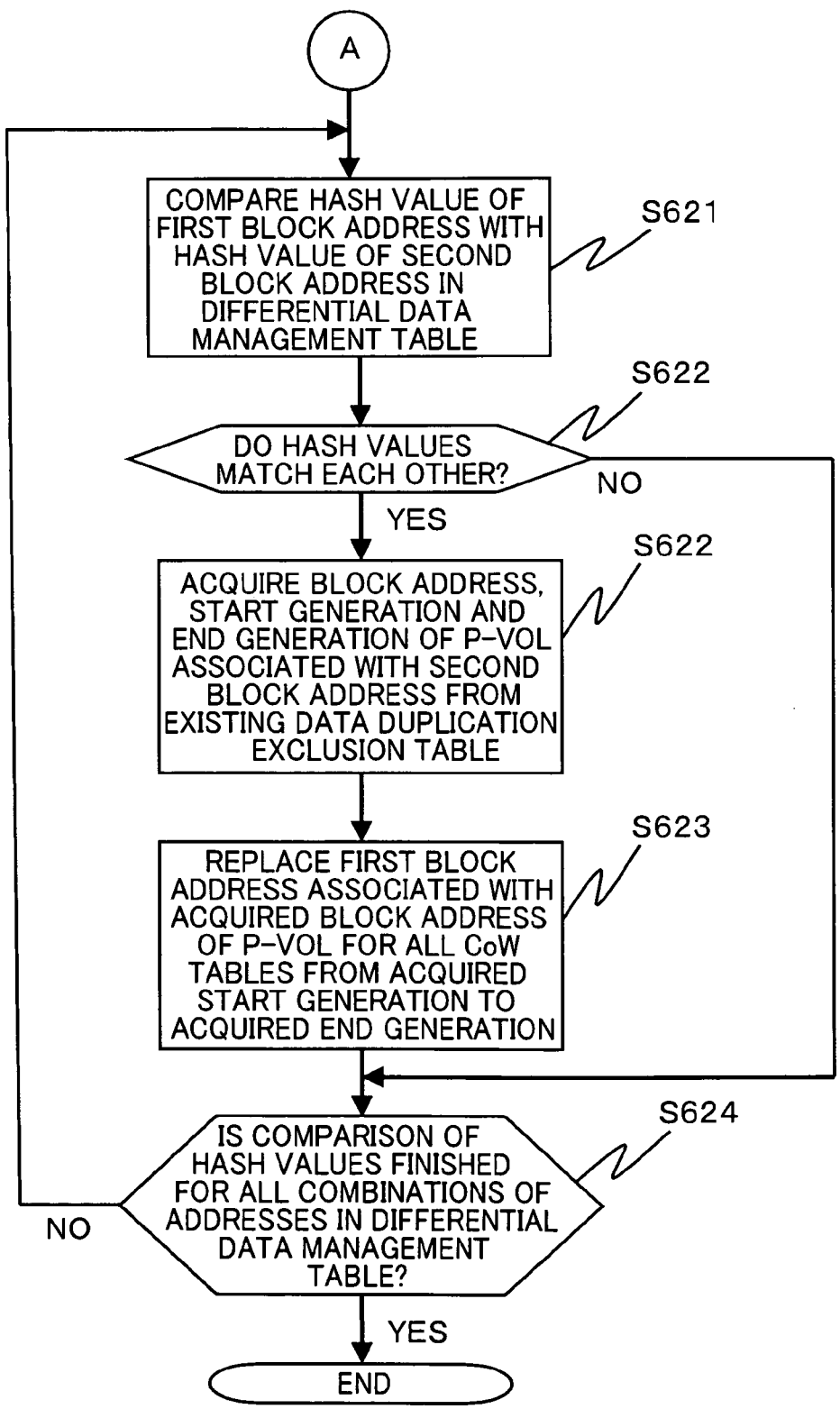
FIG. 6B is a flowchart explaining a procedure for introducing into an existing storage system a mechanism for preventing differential data from being stored in duplication in the D-VOL 23.

As shown in FIG. 6A, first of all, the duplication prevention function introduction unit 128 of the differential data management unit 120 generates a hash value table 132 (S611) and instructs the hash value generator 125 of the differential data management unit 120 to calculate a hash value.

Upon receipt of the above instruction, the hash value generator 125 obtains a hash value of data stored at each block address of the P-VOL 22 and stores the obtained hash value in the hash value table 132 in association with the corresponding block address 1321 of the P-VOL 22 (S612).

Next, the duplication prevention function introduction unit 128 generates a differential data management table 133 (S613) and instructs the hash value generator 125 to calculate a hash value of differential data stored in each block of the D-VOL 23.

Upon receipt of the above instruction, the hash value generator 125 obtains a hash value of differential data stored in each block of the D-VOL 23 and stores the obtained hash value in the differential data management table 133 in association with the block address 1331 of the D-VOL 23 (S614).

After that, the duplication prevention function introduction unit 128 refers to the CoW table 132 for all the generations and sets a value of each reference counter 1332 in the differential data management table 133. To be more specific, the duplication prevention function introduction unit 128 sequentially checks the CoW table 131 for each generation to see the contents of the storage area of the block address of the D-VOL 23. When a significant value (block address at which differential data is stored) is set in the storage area, the reference counter 1332, in the differential data management table 133, of the block address 1321 of the D-VOL 23 that corresponds to the storage area is incremented by 1 (S615). It should be noted that, when multiple P-VOLs exist, setting of the reference counter 1332 is performed on all the existing P-VOLs 22.

Next, the duplication prevention function introduction unit 128 generates an existing data duplication exclusion table 134. As shown in FIG. 3D, in the existing data duplication exclusion table 134, a block address 1342 of the P-VOL 22, a start generation 1343, and an end generation 1344 are managed in association with a block address 1341 of the D-VOL 23. Among these, what is set to the start generation 1343 is the generation number of the oldest snapshot generation in the CoW table 131, where the corresponding block address 1341 of the D-VOL 23 is stored. Moreover, what is set to the start generation 1344 is the generation number of the latest snapshot generation in the CoW table 131, where the corresponding block address 1341 of the D-VOL 23 is stored.

An explanation will be given of a method for generating the existing data duplication exclusion table 134 with FIG. 6A (S616 and the following).

First of all, the duplication prevention function introduction unit 128 selects one combination of a block address of the P-VOL 22 and that of the D-VOL 23 from the CoW table 131 (S616).

Next, the duplication prevention function introduction unit 128 determines whether the selected combination exists in the existing data duplication exclusion table 134 (S617). When the selected combination does not exist (S617: NO), processing goes to S618, and when the selected combination exists (S617: YES), processing goes to S619.

The duplication prevention function introduction unit 128 next stores the above combination in the existing data duplication exclusion table 134. Also, the duplication prevention function introduction unit 128 stores the generation of the above combination (the generation of the CoW table 131 from which the combination has been selected) in the start generation 1343 and the end generation 1344 that correspond to the selected combination.

Next, the duplication prevention function introduction unit 128 stores the generation number of the selected combination in the end generation 1344, in the existing data duplication exclusion table 134, corresponding to the selected combination. After that, processing goes to S620.

Next, the duplication prevention function introduction unit 128 determines whether all the combinations are selected from the CoW table 131 for all generations (S620). When not all the combinations have been selected (S620: NO), processing goes back to S616 from S617 to perform processing on an unselected combination. When all the combinations have already been selected (S620: YES), processing goes to S621.

By the above processing, an existing data duplication exclusion table 134 is generated in which states of the existing P-VOL 22 and D-VOL 23 are reflected.

Next, the duplication prevention function introduction unit 128 sets the block address 1341 of the D-VOL 23 in the CoW table 131 to a state where duplication is excluded. The following will explain this processing with FIG. 6B.

First of all, the duplication prevention function introduction unit 128 selects two block addresses of the D-VOL 23 from the differential data management table 133 and compares hash values of both addressees (S621) (hereinafter, these selected block addresses are respectively called a first block address and a second block address). As a result of the comparison, when the hash values of the selected addresses match each other (S621: YES), processing goes to S622, and when they do not match (S621: NO), processing goes to S624.

In S622, the duplication prevention function introduction unit 128 acquires, from the existing data duplication exclusion table 134, a block address 1342, a start generation 1343 and an end generation 1344 of the P-VOL 22, which are associated with the second block address. Then, the duplication prevention function introduction unit 128 replaces with the second block address the block address of the D-VOL 23, which is associated with the block address of the P-VOL 22 acquired in S622, for the CoW tables 132 from the obtained start generation 1343 to the obtained end generation 1344 (S623). As a result, multiple block addresses of the P-VOL 22 are associated with the same differential data stored at a certain block address of the P-VOL 23. After S623, processing goes to S624.

In S624, the duplication prevention function introduction unit 128 determines whether comparison of the hash values is finished for all combinations of addresses of the D-VOL 23 in the differential data management table 133. When the comparison of the hash values for all combinations is not yet finished (S624: NO), processing goes back to S621 to make a comparison between the hash values of other combination. When the hash values of all combinations have already been compared (S624: YES), processing is ended.

The comparison of the hash values in S621 may be omitted in the following case. Specifically, a flag, for example, may be provided in the existing data duplication exclusion table 134 to indicate whether comparison processing has already been finished. Then, prior to each comparison, determination may be made whether the comparison has already been finished or not based on the flag. When determined that the hash values have already been compared, these hash values may be excluded from the comparison target. This eliminates the hash values from being compared more than once, thereby making it possible to increase processing speed.

According to the above processing, it is possible to generate the CoW table 131, the hash value table 132, and the differential data management table 133 all corresponding to the state of the P-VOL 22 in operation. Moreover, it is possible to smoothly shift the existing system to the above-described operation mode shown in the flowchart in FIG. 4, which prevents differential data from being stored in duplication in the D-VOL 23.

It should be noted that the above embodiment has been explained to facilitate understanding of the present invention, and that the above embodiment does not limit the present invention. The present invention can be changed and modified without departing from the scope of the invention. In addition, the invention of course includes the equivalents thereof.

For example, the above description has explained the case in which the CoW table 131 manages differential data in unit of block address and determines the presence or absence of duplication of data on a block basis. However, the presence or absence of duplication of data may be determined on other unit quantity (fixed size) basis, such as a file unit basis or a chunk basis, the chunk being obtained by dividing a file into data sets each having a certain fixed size.

Moreover, in the above embodiment, the hash values are compared to determine whether data of one block address is the same as data of another block address. However, comparison of data themselves may be performed without using the hash value, or may be performed based on other characteristic quantity.

Further, numerous D-VOLs 23 are used at a data center or the like. In such a case that multiple D-VOLs 23 exist, a user may be allowed to designate for each D-VOL 23 whether to apply the duplication exclusion function.

Figure 7:
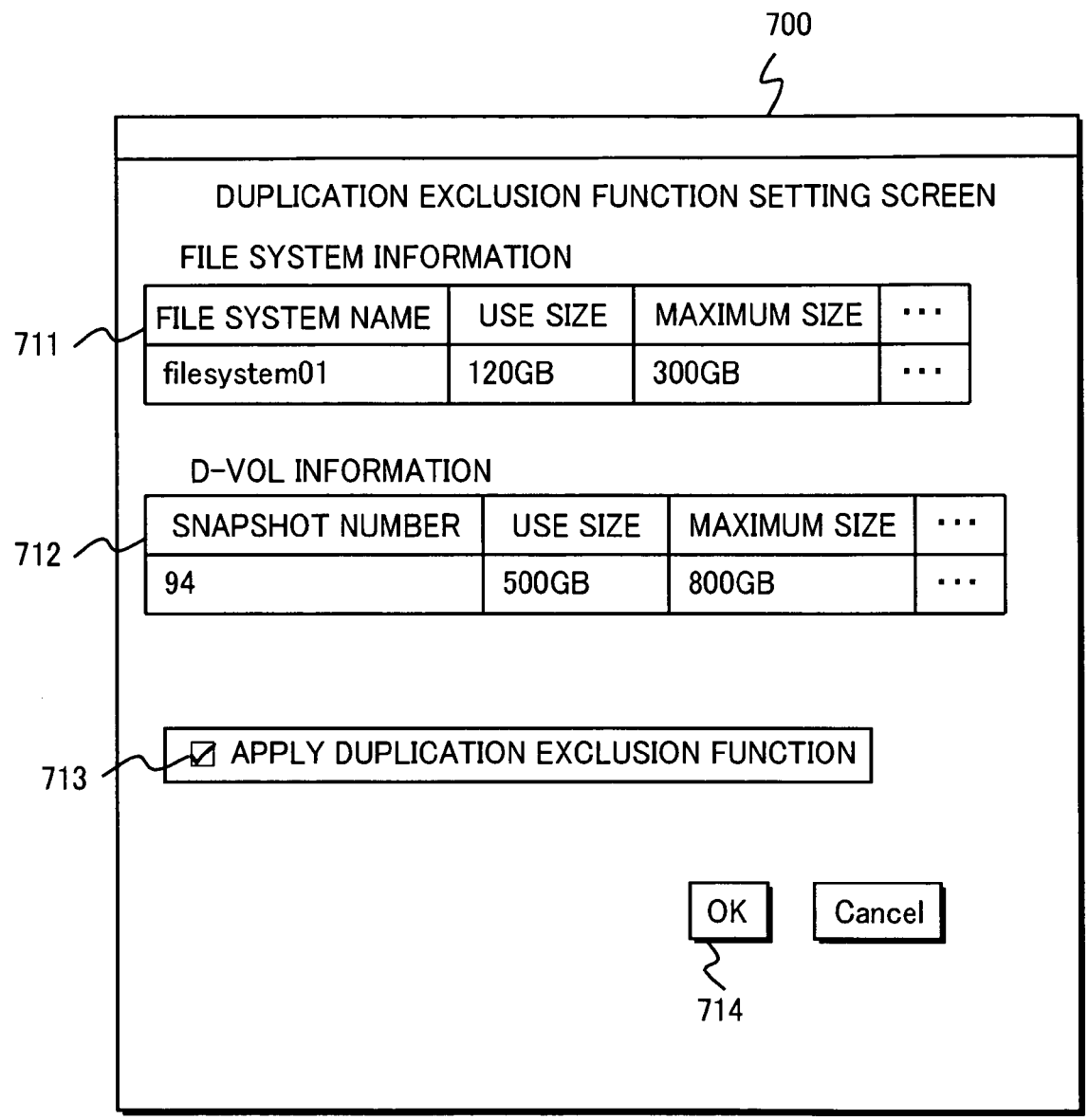
FIG. 7 is an example of a duplication exclusion function setting screen 700.

FIG. 7 shows one example of a duplication exclusion function setting screen 700 to be presented to the user when such a designation is performed. For example, to apply the duplication exclusion function to the D-VOL 23 shown in the figure, an OK button 714 is clicked after a check box 713 for designating duplication exclusion is checked.

By this means, it is possible to perform a flexible operation according to the using condition of the D-VOL 23, for example. An example of the flexible operation is not to apply the duplication exclusion function to a D-VOL 23 that requires a high speed response.

What is claimed is:

1. A storage system comprising:
   an I/O processor that performs I/O processing for a P-VOL serving as a first logical volume;
   a snapshot processor that, in order to reproduce snapshots representing states of the P-VOL at respective points in time, stores, in a D-VOL serving as a second logical volume, differential data generated by updating data in the P-VOL;
   a plurality of snapshot management tables for the snapshots each storing records for a respective snapshot, each record of each snapshot management table for a respective snapshot having a first address and a second address registered in association with the first address, the first address specifying a first storage area of the P-VOL, the second address specifying a second storage area of the D-VOL storing therein the differential data generated by updating data stored in the first storage area specified by the first address at the respective point in time for the snapshot; and a differential data management unit that determines, upon receipt of a request for updating data in the P-VOL, whether or not the same data as target data to be stored in the D-VOL is already stored in the D-VOL, the target data being differential data generated by the update, wherein, if the same data as the target data is not stored in the D-VOL, the differential data management unit stores the target data in an unused second storage area of the D-VOL, and registers, as a record in a corresponding one of the snapshot management tables, an address that specifies the second storage area where the target data is stored as the second address of the record, in association with an address in the P-VOL addressed by the update request as the first address of the record, wherein, if the same data as the target data is stored in the D-VOL, the differential data management unit does not store the target data in the D-VOL, and registers, as a record in the corresponding snapshot management table, an address that specifies the second storage area where the same data as the target data is stored as the second address of the record, in association with the address in the P-VOL addressed by the update request as the first address of the record, wherein the differential data management unit manages a differential data management table that stores, in association with each of the second addresses, a count of the records in the snapshot management tables having the second address registered therein, and wherein the differential data management unit, upon receipt of a snapshot deletion request for one of the snapshots, identifies each second address specifying a second storage area of the D-VOL storing therein differential data generated for the snapshot from the records of the snapshot management table for the snapshot, and, for each identified second address, determines whether the second address is registered in a record of the snapshot management table for any of the other snapshots based on the count of records for the second address in the differential data management table and deletes the differential data stored at the second address from the D-VOL if the second address is not registered in a record of the snapshot management table for any of the other snapshots.

2. The storage system according to claim 1, wherein the determination by the differential data management unit on whether the same data as the target data is already stored in the D-VOL is performed by comparing a first hash value for the target data with second hash values for data stored in the D-VOL.

3. The storage system according to claim 2, wherein the differential data management unit stores each of the second hash values for the data stored in a second storage area of the D-VOL in association with the second address specifying the second storage area and the count of records for the second address in the differential data management table, and, upon receipt of the snapshot deletion request, for each second address that is not registered in a record of the snapshot management table for any of the other snapshots, deletes the second hash value stored in association with the second address in the differential management table in conjunction with deleting the differential data stored at the second address.

4. The storage system according to claim 1, wherein the differential data management unit, in conjunction with registering, in the corresponding snapshot management table, the address that specifies the second storage area where the same data as the target data is stored as the second address, increments the count of records for the second address in the differential data management table, and, upon receipt of the snapshot deletion request, for each identified second address, decrements the count of records for the second address in the differential data management table.

5. The storage system according to claim 4, wherein the differential data management unit reuses the second storage area where the deleted differential data had been stored.

6. A method for operating a storage system, the method comprising:

providing a P-VOL and D-VOL respectively serving as a first and a second logical volume;

providing snapshots representing states of the P-VOL at respective points in time;

providing a plurality of snapshot management tables for the snapshots each storing records for a respective snapshot, each record of each snapshot management table for a respective snapshot having a first address and a second address registered in association with the first address, the first address specifying a first storage area of the P-VOL, the second address specifying a second storage area of the D-VOL storing therein differential data generated by updating data stored in the first storage area specified by the first address at the respective point in time for the snapshot;

upon receipt of a request for updating data in the P-VOL, determining whether or not the same data as target data to be stored in the D-VOL is already stored in the D-VOL, the target data being differential data generated by the update, if the same data as the target data is not stored in the D-VOL, storing the target data in an unused second storage area of the D-VOL, and registering, as a record in a corresponding one of the snapshot management tables, an address that specifies the second storage area where the target data is stored as the second address of the record, in association with an address in the P-VOL addressed by the update request as the first address of the record;

if the same data as the target data is stored in the D-VOL, registering, as a record in the corresponding snapshot management table, an address that specifies the second storage area where the same data as the target data is stored as the second address of the record, in association with the address in the P-VOL addressed by the update request as the first address of the record;

managing a differential data management table that stores, in association with each of the second addresses, a count of the records in the snapshot management tables having the second address registered therein; and upon receipt of a snapshot deletion request for one of the snapshots, identifying each second address specifying a second storage area of the D-VOL storing therein differential data generated for the snapshot from the records of the snapshot management table for the snapshot, and, for each identified second address, determining whether the second address is registered in a record of the snapshot management table for any of the other snapshots based on the count of records for the second address in the differential data management table and deleting the differential data stored at the second address from the D-VOL if the second address is not registered in a record of the snapshot management table for any of the other snapshots.

7. The storage system according to claim 6, wherein determining whether or not the same data as target data to be stored in the D-VOL is already stored in the D-VOL comprises comparing a first hash value for the target data with second hash values for data stored in the D-VOL.

8. The storage system according to claim 7, further comprising:

storing each of the second hash values for the data stored in a second storage area of the D-VOL in association with the second address specifying the second storage area and the count of records for the second address in the differential data management table; and upon receipt of the snapshot deletion request, for each second address that is not registered in a record of the snapshot management table for any of the other snapshots, deleting the second hash value stored in association with the second address in the differential management table in conjunction with deleting the differential data stored at the second address.

9. The storage system according to claim 6, wherein registering an address in the corresponding snapshot management table comprises incrementing the count of records for the second address in the differential data management table, and wherein deleting the differential data stored at an identified second address if the second address is not registered in a record of the snapshot management table for any of the other snapshots comprises decrementing the count of records for the second address in the differential data management table.

* * * * *